United States Patent
Park et al.

(10) Patent No.: US 9,936,322 B2
(45) Date of Patent: Apr. 3, 2018

(54) METHOD FOR IMPLEMENTING SURROUND SOUND USING A PLURALITY OF VEHICLES

(71) Applicant: HYUNDAI MOTOR COMPANY, Seoul (KR)

(72) Inventors: Jong Rok Park, Seoul (KR); Dong Gyu Noh, Dongducheon-si (KR); Cho Rong Ryu, Incheon (KR); Dae Sung Hwang, Hwaseong-si (KR); Hahk Rel Noh, Bucheon-si (KR); Su Lyun Sung, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 58 days.

(21) Appl. No.: 15/253,104

(22) Filed: Aug. 31, 2016

(65) Prior Publication Data
US 2016/0373875 A1   Dec. 22, 2016

Related U.S. Application Data

(62) Division of application No. 14/564,012, filed on Dec. 8, 2014, now Pat. No. 9,554,228.

(30) Foreign Application Priority Data

Aug. 27, 2014   (KR) ........................ 10-2014-0112420

(51) Int. Cl.
*H04S 7/00*   (2006.01)
*H04W 4/00*   (2009.01)
(Continued)

(52) U.S. Cl.
CPC ............... *H04S 3/008* (2013.01); *G08G 1/20* (2013.01); *H04S 7/30* (2013.01); *H04W 4/005* (2013.01); *H04R 2499/13* (2013.01)

(58) Field of Classification Search
CPC ........ H04S 3/00; H04S 3/008; H04R 2499/13
See application file for complete search history.

(56) References Cited

U.S. PATENT DOCUMENTS 8,233,648 B2   7/2012   Sorek et al.
9,689,958 B1 *  6/2017   Wild ...................... G01S 3/8003
(Continued)

FOREIGN PATENT DOCUMENTS

JP    2009-135750 A    6/2009
KR    10-2004-0108733 A   12/2004
(Continued)

OTHER PUBLICATIONS

English machine translation of JP 2009-135750 (Hirako, Reproduction System, Reproduction Control Device, Reproduction Control Method and Reproduction Control Program, published Jun. 2009).
(Continued)

*Primary Examiner* — Mark Fischer
(74) *Attorney, Agent, or Firm* — McDermott Will & Emery LLP

(57) ABSTRACT

The present inventive concept relates to a method for implementing surround sound system using a plurality of vehicles, which implements the surround sound by outputting a sound source corresponding to a surround sound node of itself according to a synchronization signal after each vehicle located in a local area (AVN system: Audio, Video, Navigation system) identifies the surround sound node of itself based on its position.

4 Claims, 3 Drawing Sheets

(51) Int. Cl.
*G08G 1/00* (2006.01)
*H04S 3/00* (2006.01)

(56) References Cited

U.S. PATENT DOCUMENTS

2004/0162062 A1   8/2004   Lee
2005/0141724 A1   6/2005   Hesdahl
2008/0045140 A1   2/2008   Korhonen

FOREIGN PATENT DOCUMENTS

| KR | 10-2005-0049820 A | 5/2005 |
| KR | 10-2005-0103024 A | 10/2005 |
| KR | 10-0597483 B1 | 7/2006 |
| KR | 10-2010-0042827 A | 4/2010 |
| KR | 10-2011-0021083 A | 3/2011 |

OTHER PUBLICATIONS

U.S. Notice of Allowance issued in U.S. Appl. No. 14/564,012, dated Aug. 29, 2016.

\* cited by examiner

METHOD FOR IMPLEMENTING SURROUND SOUND USING A PLURALITY OF VEHICLES

CROSS-REFERENCE TO RELATED APPLICATION

This application is Divisional of U.S. patent application Ser. No. 14/564,012, filed on Dec. 8, 2014, which claims priority to Korean Patent Application No. 10-2014-0112420, filed on Aug. 27, 2014 in the Korean Intellectual Property Office, the content of which are incorporated herein in its entirety by reference.

TECHNICAL FIELD

The present inventive concept relates to a method for implementing surround sound using multiple vehicles.

BACKGROUND OF THE INVENTIVE CONCEPT

In many mono-audio systems a single sound source is outputted through a number of speakers or one speaker, regardless of the number of speakers. In a stereo-audio system a stereoscopic sound effect is implemented by outputting audio signals from different sound sources to two speakers. Also, in a surround system the sound composed by two or more sound sources is reproduced, and outputted to a number of speakers. For example, currently, the most widely used 5.1-channel surround system outputs five different sound sources, and the source which emphasizes the bass portion of the five different sound sources is outputted through a sixth speaker.

Currently, the surround sound is implemented by using a number of wireless communication terminal, but there is the problem with this implementation of the surround sound system that limits its use to non-calling times (e.g., cannot be used when calling), due to the characteristics of the wireless communication terminals.

SUMMARY OF THE INVENTIVE CONCEPT

One or more aspects of the subject inventive concept relates to a method and configurations inventive concept for implementing surround sound system using a plurality of vehicles. The subject technology implements the surround sound system by outputting an audio signal from a sound source corresponding to a surround sound node (e.g., of a vehicle) based on a synchronization signal after each vehicle (e.g., node) located in a local area (e.g., an AVN system: Audio, Video, Navigation system) identifies the respective surround sound node associated with that vehicle based on a position of the vehicle.

The aspects of the present inventive concept are not limited by the above description, other aspects and advantages of the present inventive concept can be understood by the following description, and they will become apparent by embodiments of the present inventive concept. Also, it will be easily seen that the aspects and advantages of the present inventive concept can be realized by means described in the claims and combination thereof.

According to some aspects of the present inventive concept, a method for implementing a surround sound system for a plurality of vehicles, each vehicle having a surround sound implementation function that is in an on state includes: storing sound source data for each node of the surround sound system by each vehicle, obtaining, by each vehicle, GPS position information associated with that vehicle, obtaining, by each vehicle, GPS position information associated with other vehicles of the plurality of vehicles, identifying, by each vehicle, a respective node of the surround sound system associated with each vehicle based on the GPS position information associated with that vehicle and the GPS position information associated with the other vehicles of the plurality of vehicles, and outputting, by each vehicle, an audio signal from a sound source corresponding to that node according to a synchronization.

In another aspect, a method for implementing surround sound system using a plurality of vehicles includes: storing, by each vehicle, sound source data for each node of the surround sound system, sharing, by each vehicle, RSS (Received Signal Strength), DOA (Direction of Arrival) and TOA (Time of Arrival) measured during mutual communication, identifying, by each vehicle, a node based on a relative position based on the mutually shared RSS, DOA and TOA between the plurality of vehicles, and outputting, by each vehicle, an audio signal from a sound source corresponding to the that node according to a synchronization signal, wherein each vehicle has an implemented surround sound function that is in an on state.

BRIEF DESCRIPTION OF THE DRAWINGS

The above and other aspects, features and advantages of the present inventive concept will be more apparent from the following detailed description taken in conjunction with the accompanying drawings, in which.

DETAILED DESCRIPTION

The foregoing aspects, features and advantages will be more apparent through the detail description as below with reference to the accompanying drawings, and thus the those skilled in the art can be easily embody the technical spirit of the present inventive concept. Further, in the following description of the present inventive concept, if it is determined that the detailed description for the known art related to the present inventive concept unnecessarily obscures the gist of the present inventive concept, the detailed description thereof will be omitted. Hereinafter, with reference to the accompanying drawings, preferred embodiments of the present inventive concept will be described in detail.

Figure 1:
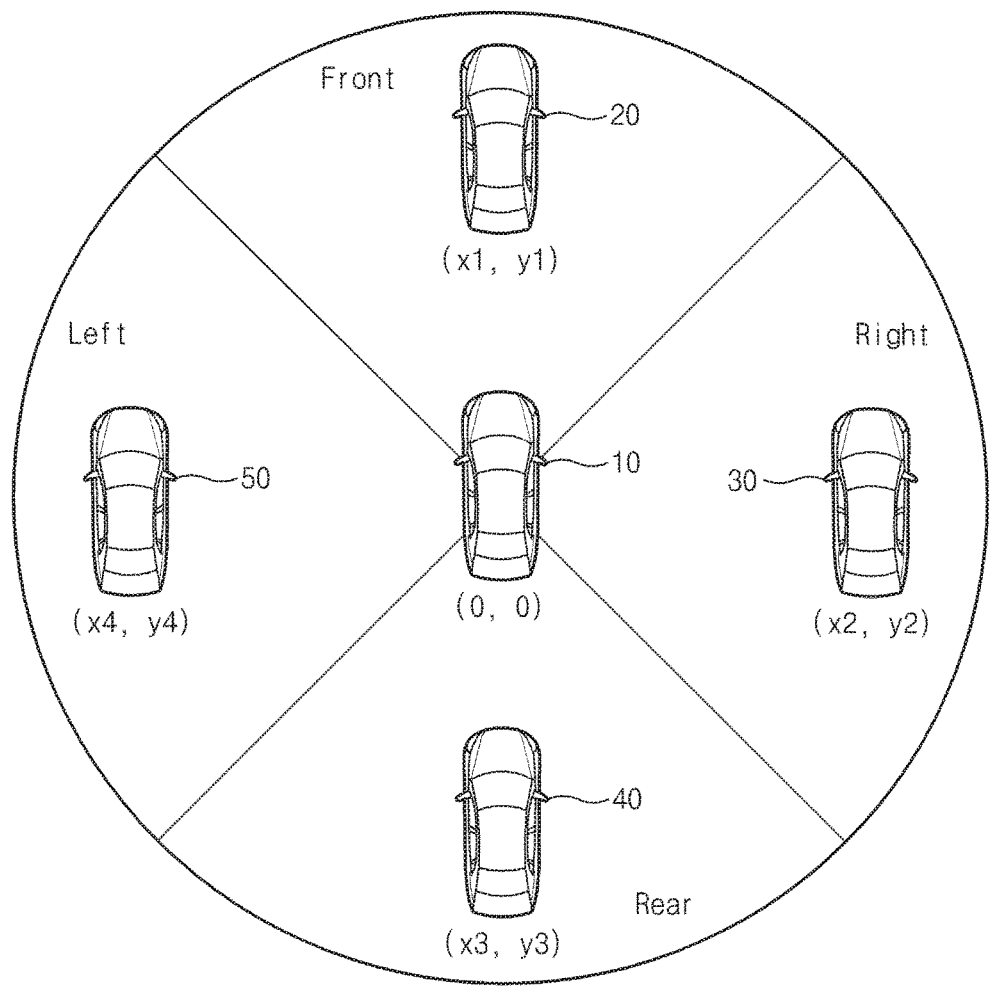
FIG. 1 is an exemplary diagram for a plurality of vehicles in which the present inventive concept is applied.

FIG. 1 is an exemplary diagram for a plurality of vehicles applying the present inventive concept.

As shown in FIG. 1, a plurality of vehicles in which the present inventive concept is applied can perform V2V (Vehicle-to-Vehicle) communication, and each vehicle includes an AVN (Audio, Video, Navigation) system. In some aspects, the AVN system stores all sound source data for each position (each node) of a surround sound system, and each node (e.g., a vehicle) can identify a corresponding node associated with that node based on the node's own GPS position information and GPS position information obtained from other vehicles (e.g., nodes) by V2V communication.

That is, each vehicle identifies its own respective position (e.g., front, right, left, rear, or center) by comparing its own GPS position information and other vehicle's GPS position information.

In one or more aspects, after identifying one's own GPS information, each vehicle outputs an audio signal from the sound source corresponding to its node according to a synchronization signal. At this time, the most centrally located vehicle 10 operates as a master and provides the synchronization signal to each vehicle.

On the other hand, each vehicle can identify its own node based on its own position by exchanging measured RSS (Received Signal Strength), DOA (Direction of Arrival) and TOA (Time of Arrival) signals when communicating with other vehicle by V2V. In some aspects, the RSS is a value representative of the strength of a received signal and can be used when measuring a relative distance. The DOA is a value representative of the direction of a received signal and can be used when estimating a relative angle. The TOA is a value representative of a transmission time and can be used when measuring a relative distance.

Figure 2:
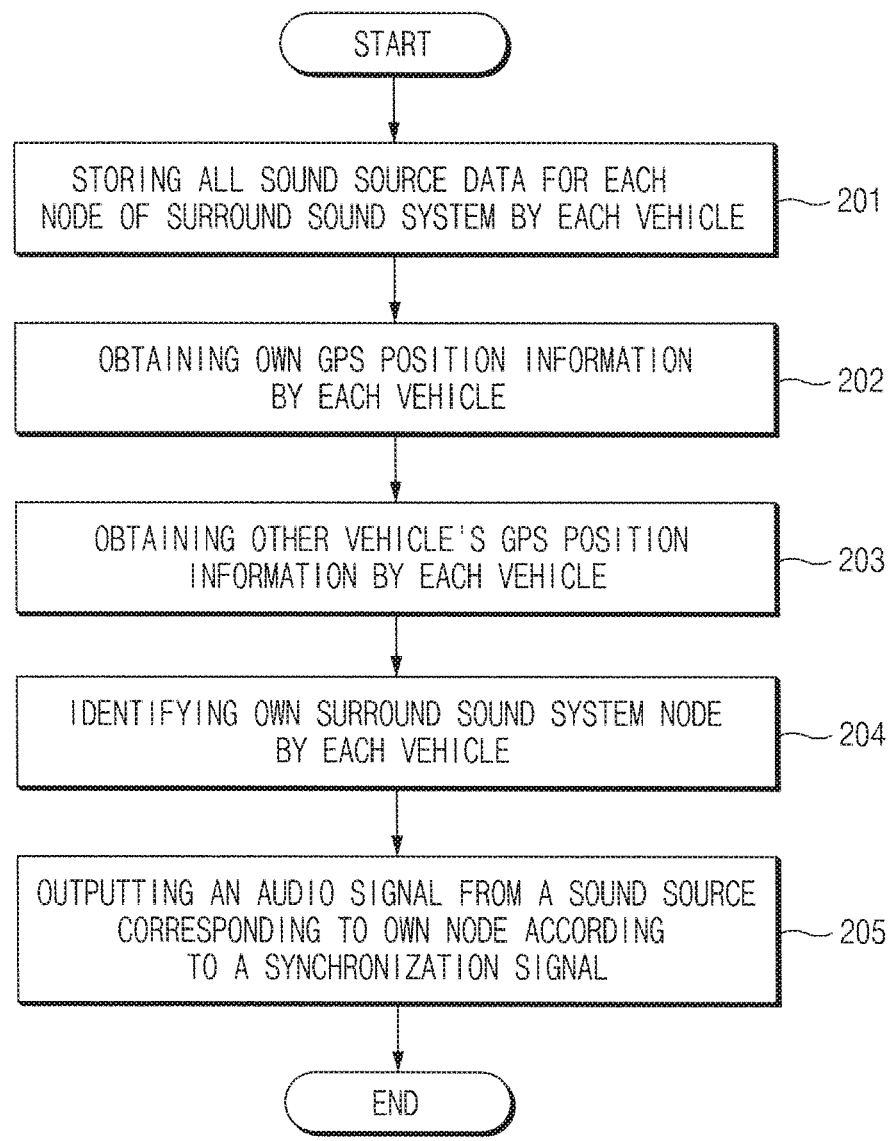
FIG. 2 is a flow chart of a method for implementing surround sound using a plurality of vehicles according to an embodiment of the present inventive concept.

In one or more implementations, the AVN system mounted in each vehicle has an on/off setting button for the surround sound implementation function, and if the surround sound implementation function is turned on by a user, the surround sound system may be implemented by the process as shown in FIG. 2.

In some aspects, the AVN system can display a sound bar through HUD (Head-Up Display) by interworking with ECU (Electronic Control Unit) in vehicle, and can operate an internal/external illumination device by interworking with the output sound source data. It provides a visual effect to a user.

FIG. 2 is a flow chart of a method for implementing surround sound using a plurality of vehicles according to an embodiment of the present inventive concept. Each vehicle may be in a state in which the sound implementation function is turned on.

First, each vehicle stores all sound source data for each node of surround sound system (201). The sound source data can be downloaded by connecting with a server (not shown for simplicity), and can be obtained through an external storage device (e.g., USB, etc.).

Then, each vehicle obtains its own GPS position information (202). The GPS position information can be easily obtained, for example, by a navigation system.

Next, each vehicle obtains other vehicle's GPS position information (203).

Then, each vehicle identifies the corresponding node of all nodes (e.g., vehicles) implementing surround sound system based on its own GPS position information and other vehicle's GPS position information (204).

Finally, each vehicle outputs an audio signal from a sound source corresponding to its own node according to a synchronization signal (205). In some implementations, the most centrally located vehicle 10 of vehicles transmits the synchronization signal to other vehicle.

Here, if the number of vehicle corresponding to a specific node is a plural, the plurality of vehicles corresponding to that specific node may perform the same operation. That is, they output the sound source data corresponding to the node according to the synchronization signal.

In addition, each vehicle can operate an illumination by interworking with the audio signals outputted by its own sound source.

Also, each vehicle can output a sound bar through a HUD.

Figure 3:
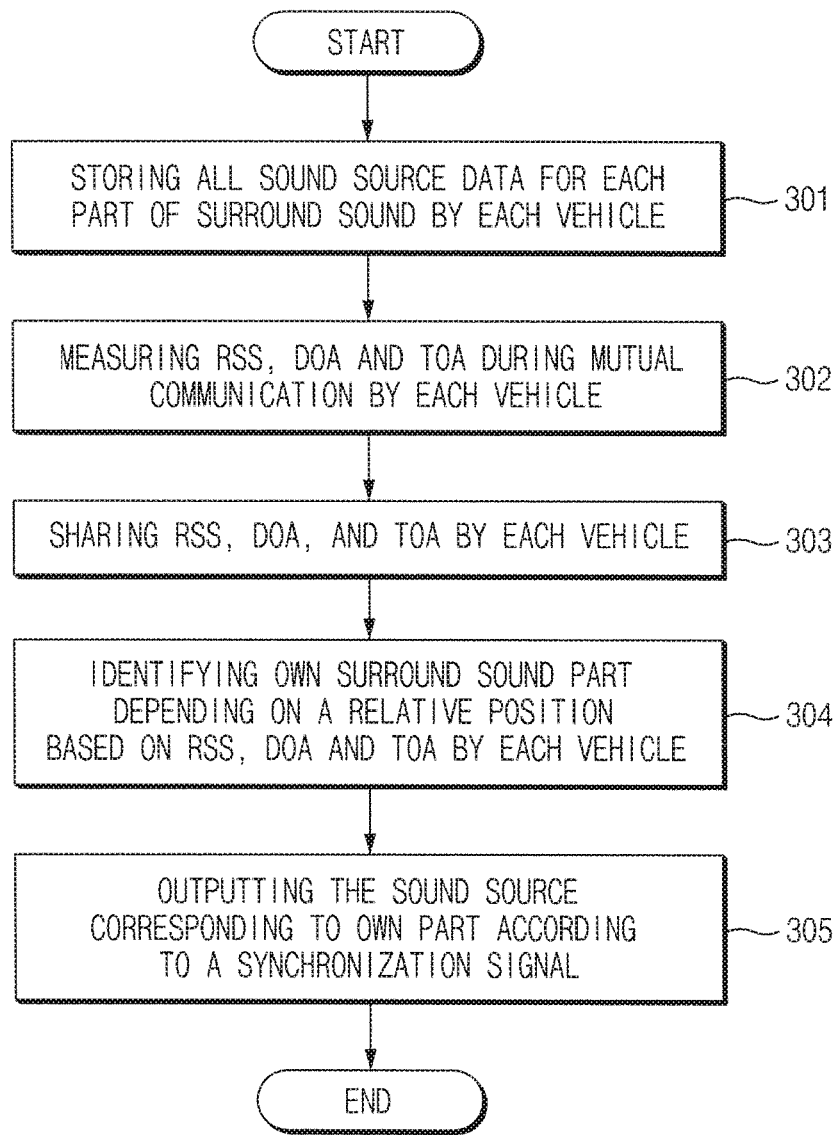
FIG. 3 is a flow chart of a method for implementing surround sound using a plurality of vehicles according to another embodiment of the present inventive concept.

FIG. 3 is a flow chart for a method for implementing surround sound using a plurality of vehicles according to another embodiment of the present inventive concept. It is understood that each vehicle may be the state which the sound implementation function is turned on.

First, each vehicle may store all sound data for each node of surround sound (301).

Next, each vehicle may measure the RSS (Received Signal Strength), the DOA (Direction of Arrival) and the TOA (Time of Arrival) during mutual V2V communication (302

Then, vehicles exchange the RSS, the DOA and the TOA between one another (303). In other words, each vehicle shares it own RSS, DOA and TOA data with other nodes.

Next, each vehicle identifies the node corresponding to the relative position based on the obtained RSS, DOA and TOA (304).

Finally, each vehicle outputs audio signals from the sound source corresponding to its own node according to the synchronization signal (305). In some implementations, the most centrally located vehicle 10 of vehicles transmits the synchronization signal to other vehicle.

In addition, each vehicle can operate an illumination by interworking with the audio signal outputted by its own sound source.

Also, each vehicle can output a sound bar through a HUD. On the other hand, as described above, the method of the present inventive concept can be implemented as a computer program. And, codes and code segments constituting the program can be easily inferred by a computer programmer in the art. Further, the created program is stored on a recording medium (information storage medium) in a computer-readable, read and executed by a computer, thereby implementing the method of the present inventive concept. And, the recording medium includes all type of recording medium which can read by a computer.

As the above described, although the present inventive concept is explained by particular configurations and drawings, the technical concept of the inventive concept is not limited to the aforementioned embodiments, and various modification and changes may be made within the equivalents of the technical concept of the present inventive concept and the appended claims by those skilled in the art.

What is claimed is:

1. A method for implementing surround sound system using a plurality of vehicles, the method comprising:
storing, by each vehicle, sound source data for each node of the surround sound system;
sharing, by each vehicle, RSS (Received Signal Strength), DOA (Direction of Arrival) and TOA (Time of Arrival) measured during mutual communication;
identifying, by each vehicle, a node based on a relative position based on the mutually shared RSS, DOA and TOA between the plurality of vehicles; and
outputting, by each vehicle, an audio signal from a sound source corresponding to the that node according to a synchronization signal, wherein each vehicle has an implemented surround sound function that is in an on state.

2. The method of claim 1, further comprising transmitting the synchronization signal to another vehicle by a most centrally located vehicle of the plurality of vehicles.

3. The method of claim 1, further comprising operating, by each vehicle, an illumination by interworking with an audio signal outputted by the sound source corresponding to that vehicle.

4. The method of claim 1, further comprising outputting, by each vehicle, a sound bar through a HUD (Head Up Display).

\* \* \* \* \*